United States Patent
Betz et al.

(10) Patent No.: US 10,513,222 B2
(45) Date of Patent: Dec. 24, 2019

(54) MOTOR VEHICLE TRIM PART WITH ILLUMINATION

(71) Applicant: DAIMLER AG, Stuttgart (DE)

(72) Inventors: Christian Betz, Sindelfingen (DE); Daniel Betz, Rottenburg-Seebronn (DE); Martin Borowski, Waiblingen (DE); Kevin Moser, Oberdigisheim (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/312,513

(22) PCT Filed: May 2, 2017

(86) PCT No.: PCT/EP2017/000542
§ 371 (c)(1),
(2) Date: Dec. 21, 2018

(87) PCT Pub. No.: WO2017/220181
PCT Pub. Date: Dec. 28, 2017

(65) Prior Publication Data
US 2019/0255992 A1  Aug. 22, 2019

(30) Foreign Application Priority Data

Jun. 23, 2016 (DE) .......... 10 2016 007 709

(51) Int. Cl.
*B60Q 3/62* (2017.01)
*B60Q 3/54* (2017.01)
(Continued)

(52) U.S. Cl.
CPC .......... *B60Q 3/62* (2017.02); *B60Q 3/54* (2017.02); *B60Q 3/78* (2017.02); *B60R 13/02* (2013.01);
(Continued)

(58) Field of Classification Search
CPC ... B60Q 3/62; B60Q 3/64; B60Q 3/78; B60Q 3/54; B60Q 2500/10; F21S 43/235; G02B 6/0075; G02B 6/0076; G02B 6/0078
See application file for complete search history.

(56) References Cited

U.S. PATENT DOCUMENTS 5,984,497 A * 11/1999 Foerstner ............. B60Q 1/0011
  362/511
6,461,006 B1 * 10/2002 Matumoto ............. G01D 11/28
  362/23.16
(Continued)

FOREIGN PATENT DOCUMENTS

DE       10356483 A1  7/2005
DE    102006007491 A1  8/2007
(Continued)

OTHER PUBLICATIONS

International Search Report dated Aug. 4, 2017 in related/corresponding International Application No. PCT/EP2017/000542.
(Continued)

*Primary Examiner* — Alexander K Garlen
(74) *Attorney, Agent, or Firm* — Patent Portfolio Builders PLLC

(57) ABSTRACT

A motor vehicle trim part with illumination includes a visible panel that is at least partly translucent and has a visible side. At least one illuminating element is arranged on the opposite side of the visible side of the visible panel. At least one light guide is arranged so that the light of the at least one illuminating element can be coupled and which is optically coupled to the visible panel. The at least one light guide defines a first light path, the end face of which is optically coupled to the visible panel, and a second light path is defined, the lateral surface of which is coupled to the visible panel.

14 Claims, 2 Drawing Sheets

(51) Int. Cl.
  *B60R 13/02*   (2006.01)
  *F21V 8/00*   (2006.01)
  *B60Q 3/78*   (2017.01)

(52) U.S. Cl.
  CPC ......... *G02B 6/0028* (2013.01); *G02B 6/0065* (2013.01); *B60R 2013/0287* (2013.01)

(56) References Cited

U.S. PATENT DOCUMENTS

| | | | |
|---|---|---|---|
| 8,319,653 B2 * | 11/2012 | Takebe | B60K 37/02 340/691.1 |
| 8,998,466 B2 | 4/2015 | Wilfert | |
| 9,151,461 B1 * | 10/2015 | Kuo | G02B 19/0066 |
| 9,261,254 B2 | 2/2016 | de Lamberterie et al. | |
| 9,995,451 B2 | 6/2018 | Brosinger et al. | |
| 2013/0003398 A1 * | 1/2013 | Godbillon | G02B 6/001 362/511 |
| 2013/0194816 A1 | 8/2013 | Hager et al. | |

FOREIGN PATENT DOCUMENTS

| | | |
|---|---|---|
| DE | 102008008180 A1 | 8/2009 |
| DE | 102009055427 A1 | 7/2011 |
| DE | 102011016420 A1 | 10/2012 |
| DE | 102013012228 A1 | 1/2015 |
| DE | 102013021086 A1 | 6/2015 |
| DE | 102014219975 A1 | 4/2016 |
| EP | 2378187 A1 | 10/2011 |
| EP | 2679884 A1 | 1/2014 |
| EP | 2784374 A1 | 10/2014 |
| EP | 2796322 A1 | 10/2014 |
| EP | 2811219 A1 | 12/2014 |
| GB | 2435937 A | 9/2007 |

OTHER PUBLICATIONS

Search Report created on Apr. 25, 2017 in related/corresponding DE Application No. 10 2016 007 709.3.
Written Opinion dated Aug. 4, 2017 in related/corresponding International Application No. PCT/EP2017/000542.

* cited by examiner

MOTOR VEHICLE TRIM PART WITH ILLUMINATION

BACKGROUND AND SUMMARY OF THE INVENTION

A motor vehicle trim part having a lighting system is described in the following, which trim part comprises a screen that is permeable to light at least in portions and has a visible face, furthermore at least one illuminating element, which is arranged on the opposite side of the visible face of the screen, and at least one light guide being provided, into which light guide the at least one illuminating element can be coupled.

High standards are applied to the aesthetic design of motor vehicle interiors, in particular in higher-priced motor vehicle classes, such as in luxury sedans. A sleek, modern aesthetic appearance is frequently sought, while simultaneously providing atmospheric, intense lighting.

DE 10 2011 016 420 A1 discloses an interior lighting system for a vehicle comprising at least one uncoupling region for illuminating the vehicle interior by at least one illumination device, the illumination device comprising at least one light source for producing light and at least one light guide in which the light can be coupled or is coupled, the light guide being configured to uncouple the light over the entire surface in the at least one uncoupling region and having an additional lighting system for producing an additional light, which system is also designed for illuminating the vehicle interior, the additional lighting system passing the additional light into the interior via the at least one light guide starting from a side of the at least one light guide that is remote from the vehicle interior in a light transmission region.

DE 10 2009 055 427 A1 discloses a motor vehicle inner trim part having a light source comprising a plastics injected part that has a wall, the light source being configured to emit light onto the inner side of the wall, the light source being designed such that light hitting the inner side of the wall from the light source has an intensity such that the light of the light source cannot be visually perceived through the wall, the wall comprising a region having a reduced wall thickness in which the light of the light source can be visually perceived through the wall.

However, this means that the corresponding component is structurally weak and complicated to manufacture. In addition, it is difficult to produce high-contrast, striking lighting scenarios.

Exemplary embodiments are directed to a motor vehicle trim part of the type mentioned at the outset such that a reduced aesthetic can be combined with striking lighting.

In the following, a motor vehicle trim part having a lighting system is described, the trim part comprising a screen that is permeable to light at least in portions and has a visible face, furthermore at least one illuminating element, which is arranged on the opposite side of the visible face of the screen, furthermore at least one light guide being provided into which the at least one illuminating element can be coupled and which is optically coupled to the screen.

A corresponding motor vehicle trim part may be, for example, a trim part in the motor vehicle, for example on a dashboard, a roof liner or a door trim. Other trim parts in the motor vehicle may be equipped correspondingly. When assembled, the illuminating element is arranged on the non-visible face of the motor vehicle trim part.

The at least one light guide defines a first light path, the end face of which is coupled to the screen, so that light is coupled into the light guide by the illuminating element and is uncoupled at the end face, resulting in coupling into the screen. Because the screen is permeable to light in portions, the light of the illuminating element shows through the screen. Because the light of the illuminating element is coupled in via the non-visible face of the screen, light appears on the visible face of the screen without a visible light source and with no visual break in the screen. The motor vehicle trim part can therefore be designed such that when the illuminating element is switched off, it is not possible to detect that the motor vehicle trim part has an illumination function.

Furthermore, a second light path is defined in the motor vehicle trim part, a lateral face of which light path is coupled to the screen. As a result, light can be emitted to the screen over the surface thereof, such that the screen is illuminated at least over parts of the surface thereof.

Due to the combination of the two light paths, different zones having various illumination can be arranged in the screen, for example a point or a line having relatively bright illumination that is produced by means of coupling out of the first light path at the end face, and a weaker illumination over the surface in other zones of the trim part, e.g. in the surface adjacent to the bright illumination.

According to an embodiment, the second light path can be determined by at least one second light guide. One light guide for each light path can therefore be used, as a result of which the light guides can be optimized for the relevant task.

Alternatively, it is possible, according to another embodiment, to indicate the second light path by the first light guide. This can reduce the number of necessary components.

In an embodiment, the second light path may be bent, as a result of which it is easier to arrange the illuminating element behind the visible face and to couple into the screen over the surface thereof.

In an embodiment, the second light path may be bent by means of a deflecting mirror or a prism. This can prevent bends in the light guide that potentially cause critical angles that are greater than the total reflection angles.

In an embodiment, the screen may be transparent or translucent. As a result, various illumination characteristics can be produced. The screen may consist of tinted glass or a material similar to tinted glass.

In another embodiment, a semi-transparent film may be arranged between the screen and the at least one light guide. A semi-transparent film of this kind can reduce visibility through the screen and produce specific illumination effects.

In another embodiment, the light guide may be made of a volume-dispersing material at least in part in the region of the second light path. This permits uncoupling over a surface.

In another embodiment, the light guide may be in two parts. As a result, the motor vehicle trim part may be dismountable, for example such that the screen can be dismantled, but the illuminating element does not have to be dismantled as well. This makes maintenance easier.

In another embodiment, the light guide and the screen may be attached to a support. The support makes it easier to assemble the motor vehicle trim part.

BRIEF DESCRIPTION OF THE DRAWING FIGURES

The invention is explained with reference to embodiments. In the drawings, in each case schematically:

Like or analogous components are provided with like reference signs in the following for the sake of better readability.

DETAILED DESCRIPTION

Figure 1:
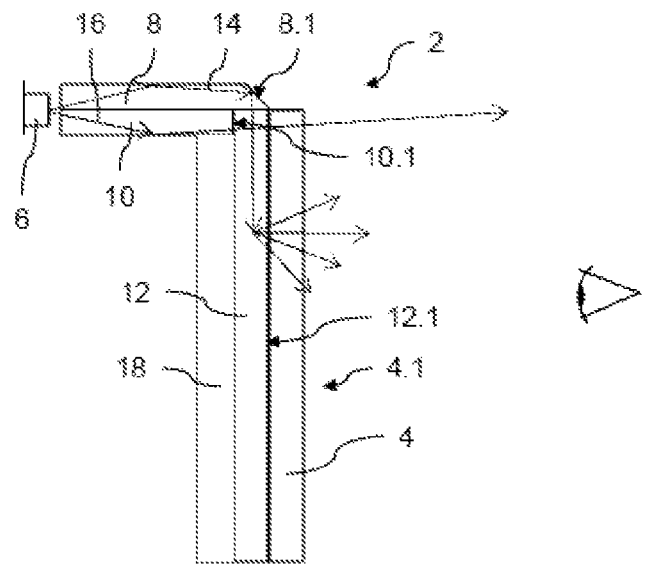
FIG. 1 is a cross-section through a motor vehicle trim part in a first embodiment.

FIG. 1 is a cross section through a motor vehicle trim part 2 according to a first embodiment.

The motor vehicle trim part 2 comprises a screen 4 having a visible face 4.1. The motor vehicle trim part 2 further comprises an illuminating element 6, for example an LED, for illuminating the screen 4 from behind. The illuminating element 6 couples light into a first light-guiding element 8 and a second light-guiding element 10 arranged in parallel therewith.

Instead of an illuminating element, a row or strip of illuminating elements may be provided. The light in the diffusely scattering light-guiding layer 12 is emitted over a surface and therefore produces a weaker luminous impression in the screen, so that a strong linear gleam of light transforms into a weak, possibly fading gleam of light.

The first light-guiding element 8 has an inclined end face 8.1, which is prismatic. Incident light is deflected by total reflection at the boundary surface of the end face 8.1.

The end face of the light-guiding element 8 is coupled into a light-guiding layer 12, which is designed as a volume scatterer, for example as PMMA df23, a diffusely scattering polymethyl methacrylate (Plexiglas). A first light path 14 is shown accordingly.

The lateral surface 12.1 of the light guiding layer 12 is coupled to the screen 4.

The end face 10.1 of the second light guiding element 10 is coupled to the light guiding layer 12. A second light path 16, which is guided through the second light-guiding element 10, is guided through the light-guiding element 12 and penetrates the semi-transparent screen 4. Depending on the design of the illuminating element 6 and of the motor vehicle trim part 2, a linear light impression can be produced on the visible face 4.1.

The illuminating element 6, the first and second light elements 8, 10, the light-guiding layer 12 and the screen 4 are assembled on a support 18.

Figure 2:
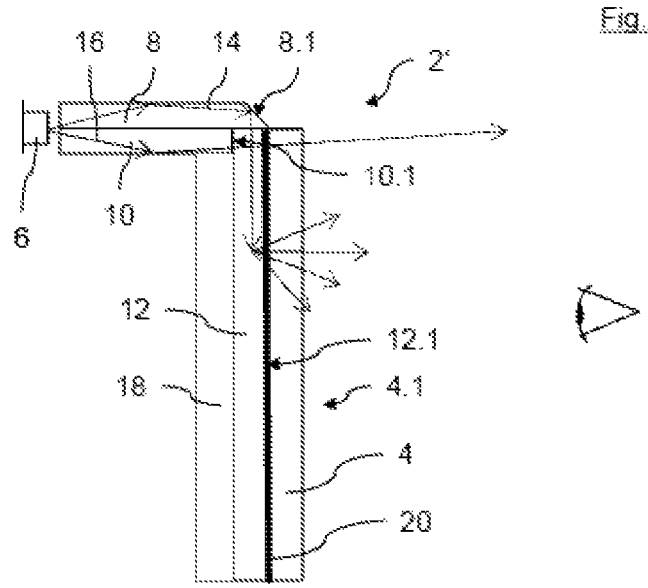
FIG. 2 is a cross-section through a motor vehicle trim part in a second embodiment.

FIG. 2 is a sectional view of a second embodiment of a motor vehicle trim part 2'.

The motor vehicle trim part 2 comprises a screen 4 having a visible face 4.1. The motor vehicle trim part 2 further comprises an illuminating element 6, for example an LED, for illuminating the screen 4 from behind. The illuminating element 6 couples light into a first light-guiding element 8 and a second light-guiding element 10 arranged in parallel therewith.

Instead of an illuminating element, a row or strip of illuminating elements may be provided. The light in the diffusely scattering light-guiding layer 12 is emitted over a surface and therefore produces a weaker luminous impression in the screen, so that a strong linear gleam of light transforms into a weak, possibly fading gleam of light.

The first light-guiding element 8 has an inclined end face 8.1, which is prismatic. Incident light is deflected by total reflection at the boundary surface of the end face 8.1.

The end face of the light-guiding element 8 is coupled into a light-guiding layer 12, which is designed as a volume scatterer, for example as PMMA df23, a diffusely scattering polymethyl methacrylate (Plexiglas). A first light path 14 is shown accordingly.

The end face 10.1 of the second light guiding element 10 is coupled to the light guiding layer 12. A second light path 16, which is guided through the second light-guiding element 10, is guided through the light-guiding element 12 and penetrates the screen 4. Depending on the design of the illuminating element 6 and of the motor vehicle trim part 2, a linear light impression can be produced on the visible face 4.1.

A semi-transparent film 20 is provided between the light guiding layer 12 and the screen 4, which conceals components located behind from view from the visible face 4.1. The lateral surface 12.1 of the light guiding layer 12 is coupled to the semi-transparent film 20.

By using the semi-transparent film 20, the screen 4 can be made of a transparent material, such as a plastics material.

The illuminating element 6, the first and second light elements 8, 10, the light-guiding layer 12 and the screen 4 are assembled on a support 18.

Figure 3:
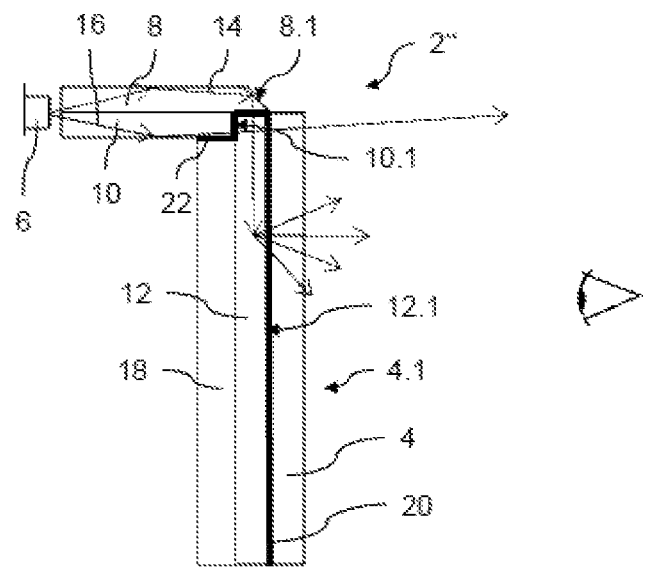
FIG. 3 is a cross-section through a motor vehicle trim part in a third embodiment.

FIG. 3 is a cross section through a motor vehicle trim part 2" according to a third embodiment.

The motor vehicle trim part 2 comprises a screen 4 having a visible face 4.1. The motor vehicle trim part 2 further comprises an illuminating element 6, for example an LED, for illuminating the screen 4 from behind. The illuminating element 6 couples light into a first light-guiding element 8 and a second light-guiding element 10 arranged in parallel therewith.

Instead of an illuminating element, a row or strip of illuminating elements may be provided. The light in the diffusely scattering light-guiding layer 12 is emitted over a surface and therefore produces a weaker luminous impression in the screen, so that a strong linear gleam of light transforms into a weak, possibly fading gleam of light.

The first light-guiding element 8 has an inclined end face 8.1, which is prismatic. Incident light is deflected by total reflection at the boundary surface of the end face 8.1.

The end face of the light-guiding element 8 is coupled into a light-guiding layer 12, which is designed as a volume scatterer, for example as PMMA df23, a diffusely scattering polymethyl methacrylate (Plexiglas). A first light path 14 is shown accordingly.

The end face 10.1 of the second light guiding element 10 is coupled to the light guiding layer 12. A second light path 16, which is guided through the second light-guiding element 10, is guided through the light-guiding element 12 and penetrates the semi-transparent screen 4. Depending on the design of the illuminating element 6 and of the motor vehicle trim part 2, a linear light impression can be produced on the visible face 4.1.

A semi-transparent film 20 is provided between the light guiding layer 12 and the screen 4, which conceals components located behind from view from the visible face 4.1. The lateral surface 12.1 of the light guiding layer 12 is coupled to the semi-transparent film 20.

The illuminating element 6, the first and second light elements 8, 10, the light-guiding layer 12 and the screen 4 are assembled on a support 18.

By using the semi-transparent film 20, the screen 4 can be made of a transparent material, such as a plastics material.

A separating line 22 is also provided, which makes it possible to dismantle the screen 4, for example in order to be able to easily exchange the screen.

The separating line 22 may also be provided in a semi-transparent screen without a semi-transparent film, as shown in FIG. 1, for example.

Figure 4:
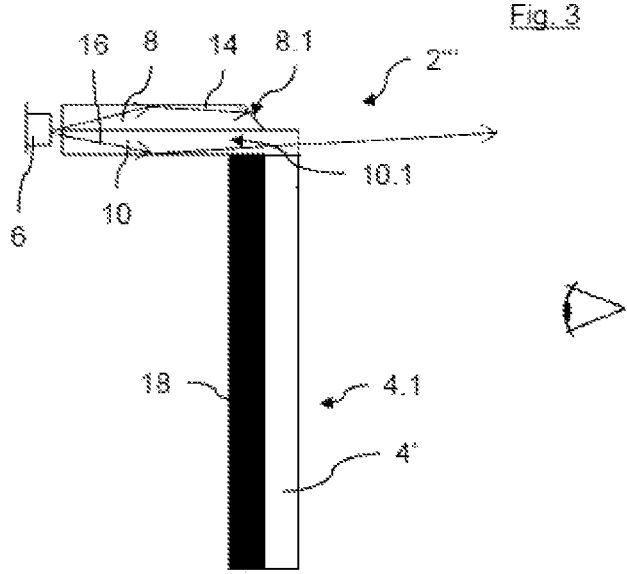
FIG. 4 is a cross-section through a motor vehicle trim part in a fourth embodiment.

FIG. 4 is a cross section through a fourth embodiment.

In this case, proceeding from the embodiment in FIG. 3, the screen 4 is replaced, in addition to the light-guiding layer 12 and the support 18, by an alternative screen 4' which is not permeable to light at least in part. As a result, the second light-guiding element 10 protrudes and can emit a clearly defined line. It is not possible to illuminate the screen 4' over the entire surface thereof.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A motor vehicle trim part, comprising:
   a screen having a least portions that are permeable to light comprises a visible face;
   at least one illuminating element arranged on an opposite side of the visible face of the screen; and
   at least one light guide into which light of the at least one illuminating element is coupled and which is optically coupled to the screen,
   wherein the at least one light guide defines
      a first light path, an end face of which is optically coupled to the screen, and
      a second light path, a lateral face of which is optically coupled to the screen,
   wherein the at least one light guide includes a diffusely scattering light-guiding layer having a lateral surface coupled to the screen, and
   wherein the lateral face of the second light path passes through the lateral surface of the diffusely scattering light-guiding layer and through at least portions of the screen, and the end face of the first light path passes through the lateral face of the diffusely scatting light-guiding layer and through at least portions of the screen.

2. The motor vehicle trim part of claim 1, wherein the at least one light guide includes a first light guide defining the first light path and a second light guide defining the second light path.

3. The motor vehicle trim part of claim 1, wherein the second light path is defined by the at least one light guide.

4. The motor vehicle trim part of claim 1, wherein the second light path is bent.

5. The motor vehicle trim part of claim 4, further comprising:
   a deflection mirror or a prism configured to bend the second light path.

6. The motor vehicle trim part of claim 1, wherein the screen is transparent or translucent.

7. The motor vehicle trim part of claim 1, further comprising:
   a semi-transparent film arranged between the screen and the at least one light guide.

8. The motor vehicle trim part of claim 1, wherein the light guide is made of a volume-dispersing material at least in part in a region of the second light path.

9. The motor vehicle trim part of claim 1, wherein the light guide is comprised of two parts.

10. The motor vehicle trim part of claim 1, wherein the light guide and the screen are attached to a support.

11. The motor vehicle trim part of claim 2, wherein the first and second light guides are arranged parallel with each other.

12. The motor vehicle trim part of claim 1, wherein the at least one light guide includes a prismatic inclined end face that couples the second light path into the diffusely scattering light-guiding layer.

13. The motor vehicle trim part of claim 12, wherein the prismatic inclined end face is a deflecting mirror.

14. The motor vehicle trim part of claim 12, wherein the prismatic inclined end face is a deflecting prism.

* * * * *